(12) United States Patent
Zitelli et al.

(10) Patent No.: US 10,836,104 B2
(45) Date of Patent: Nov. 17, 2020

(54) THREE-DIMENSIONAL PRINTING SYSTEM WITH ROTATING MEMBRANE

(71) Applicant: NEXA3D Inc., Ventura, CA (US)

(72) Inventors: Gianni Zitelli, Ciampino (IT); Avi N. Reichental, Carpinteria, CA (US); Luciano Tringali, Rome (IT)

(73) Assignee: Nexa3D Inc., Ventura, CA (US)

( * ) Notice: Subject to any disclaimer, the term of this patent is extended or adjusted under 35 U.S.C. 154(b) by 285 days.

(21) Appl. No.: 16/029,498

(22) Filed: Jul. 6, 2018

(65) Prior Publication Data

US 2019/0009470 A1   Jan. 10, 2019

Related U.S. Application Data

(60) Provisional application No. 62/530,806, filed on Jul. 10, 2017.

(51) Int. Cl.
| | |
|---|---|
| *B29C 64/255* | (2017.01) |
| *B33Y 10/00* | (2015.01) |
| *B33Y 30/00* | (2015.01) |
| *B29C 64/135* | (2017.01) |
| *B29C 64/124* | (2017.01) |
| *B33Y 40/00* | (2020.01) |
| *B29C 64/241* | (2017.01) |

(52) U.S. Cl.
CPC .......... *B29C 64/255* (2017.08); *B29C 64/124* (2017.08); *B29C 64/135* (2017.08); *B29C 64/241* (2017.08); *B33Y 10/00* (2014.12); *B33Y 30/00* (2014.12); *B33Y 40/00* (2014.12)

(58) Field of Classification Search
None
See application file for complete search history.

(56) References Cited

U.S. PATENT DOCUMENTS

2015/0224710 A1*   8/2015   El-Siblani .............. B33Y 30/00
                                                              264/401

FOREIGN PATENT DOCUMENTS

| WO | 2014/186463 A1 | 11/2014 |
| WO | 2017/056124 A1 | 4/2017 |

OTHER PUBLICATIONS

International Search Report and Written Opinion dated Oct. 12, 2018, from the ISA/EPO, for International Patent Application No. PCT/US2018/041225 (filed Jul. 9, 2018), 14 pages.

(Continued)

*Primary Examiner* — Nathan T Leong
(74) *Attorney, Agent, or Firm* — Ascenda Law Group, PC

(57) ABSTRACT

A 3D printing apparatus includes a tank holding a photo-curing liquid polymer. A transparent membrane forms a bottom surface of the tank. A circular-shaped disk is disposed below the membrane, and is supported by a frame that has a radiation-transparent printing window. The liquid polymer is cured into desired shapes by exposure to radiation as the membrane is rotated about an axis. The rotation of the membrane causes a first region thereof to be rotated out of the printing window and a second region thereof to be rotated into the printing window. A light source projects the radiation through the printing window, through the second region of the membrane, into the photo-curing liquid polymer and onto a focal plane in the photo-curing liquid polymer, thereby curing a portion of the photo-curing liquid polymer.

19 Claims, 23 Drawing Sheets

(56) References Cited

OTHER PUBLICATIONS

International Preliminary Report on Patentability dated Aug. 12, 2019, from the IPEA/US, for International Patent Application No. PCT/US2018/041225 (filed Jul. 9, 2018), 35 pages.

* cited by examiner

THREE-DIMENSIONAL PRINTING SYSTEM WITH ROTATING MEMBRANE

RELATED APPLICATIONS

This is a NONPROVISIONAL of and claims the priority benefit of U.S. Provisional Application 62/530,806, filed 10 Jul. 2017, incorporated herein by reference.

FIELD OF THE INVENTION

The present invention relates to the field of three-dimensional printing, commonly referred to as 3D printing, and in particular relates to a 3D printing system with a rotating membrane which allows the membrane to be refreshed by rotating the membrane about an axis of rotation perpendicular to the surface of the membrane.

BACKGROUND 3D printing is becoming ever more widespread, allowing three-dimensional objects to be fabricated (often in a short amount of time) in any facility (i.e., room, garage, laboratory, etc.). Typically, cross-sections of a three-dimensional object are modelled and saved into a digital format, and the three-dimensional object is fabricated layer by layer using the cross-sectional models.

Techniques are described below for improving the design of 3D printing systems, the improved design providing the benefits of improved reliability, an extended lifetime of system components, and improved ease of use.

SUMMARY OF THE INVENTION

In one embodiment of the invention, a 3D printing apparatus includes a tank, having a sidewall, and configured to hold a photo-curing liquid polymer, and a membrane that is transparent to a radiation emitted by a light source, where the membrane forms a bottom surface of the tank. A circular-shaped disk is disposed below the membrane, and is also transparent to the radiation. A frame supports the circular-shaped disk, and a base portion of the frame includes a radiation-transparent printing window. The apparatus also includes means for rotating the membrane about an axis of rotation, which axis of rotation is parallel to a propagation direction of the radiation.

In some embodiments, the tank sidewall and the membrane are a unibody form. Alternatively, the tank sidewall and the membrane may be separately manufactured components and the membrane friction fit to a lower portion of the tank sidewall.

In some instances, the membrane is transparent to radiation within a first frequency band that includes one or more frequencies corresponding to activation frequencies of photo-curing agents included in the photo-curing liquid polymer. Likewise, the circular-shaped disk may be transparent to radiation within the first frequency band that includes one or more frequencies corresponding to activation frequencies of photo-curing agents included in the photo-curing liquid polymer.

Preferably, the base portion of the frame includes a circular-shaped rim above which the circular-shaped disk is disposed, and wherein the radiation-transparent printing window is located adjacent to a center of the circular-shaped rim.

The 3D printing apparatus may also include an extraction plate configured to suspend therefrom a partially formed photo-cured object at least partially within the photo-curing liquid polymer. A channel configured to transport photo-curing liquid polymer from a reservoir of photo-curing liquid polymer into the tank may also be present. Further, a light engine configured to emit the radiation may be disposed beneath the radiation-transparent printing window of the frame. The apparatus and various components thereof are preferably under the control of a processor-based controller, which is communicatively coupled to the light engine and the means for rotating the membrane, which may, for example, include a stepper motor and a transmission system having an end effector, wherein rotational motion produced by the motor is delivered via the transmission system to the circular-shaped disk by the end effector. In some cases, the means for rotating the membrane is included in the frame and is configured to impart a rotational motion to the tank via a magnetic coupling between the rotating means and the tank sidewall.

The 3D printing apparatus may also include a lubricant brush configured to spread a lubricant onto the membrane. Such a lubricant brush may be disposed inside the tank over a region of the frame other than the radiation-transparent printing window, which may be formed by a cut-out in the base portion. The frame also may include a frame sidewall configured to surround the tank sidewall. In some embodiments, the circular-shaped disk may be made of borosilicate glass and may be frictionally coupled to the membrane.

In embodiments of the invention, a photo-curing liquid polymer may be cured (e.g., into the shape of a three-dimensional object, by exposure to a radiation, during which process a membrane is rotated about an axis of rotation that is parallel to a propagation direction of the radiation. The membrane forms a base of a tank that is configured to hold the photo-curing liquid polymer and a first region of the membrane is disposed over a printing window of a frame that supports the tank. The rotation of the membrane causes the first region of the membrane to be rotated out of the printing window and a second region of the membrane to be rotated into the printing window. A light source projects the radiation through the printing window, through the second region of the membrane, into the photo-curing liquid polymer and onto a focal plane in the photo-curing liquid polymer, thereby curing a portion of the photo-curing liquid polymer and forming a cured layer of the three-dimensional object.

In some embodiments, t printing process also involves spreading, by a lubricant brush, a lubricant onto the membrane, the lubricant substantially preventing the cured layer from attaching to the membrane. Further, and subsequent to forming the cured layer, the three-dimensional object may be elevated relative to the tank, thereby increasing a distance between the membrane and the three-dimensional object. As the supply of the photo-curing liquid polymer in the tank becomes depleted, the tank is replenished with additional photo-curing liquid polymer.

Still further embodiments of the invention provide a rotationally-symmetric tank configured to hold a photo-curing liquid polymer, and which includes a circular-shaped membrane that is transparent to a radiation emitted by a light source and a cylindrically-shaped tank sidewall. The membrane forms a bottom surface of the tank, and the tank is configured to be received within and then subsequently removed from a cavity of a frame at various times. A top portion of the tank is unsealed so as to allow an extraction plate to extract an object at least partially formed within the photo-curing liquid polymer. The membrane may be composed of a self-lubricating, silicone-based polymer material, and is attached to an inward facing surface of the cylindrically-shaped tank sidewall. For example, the membrane may be fit over a rim of the cylindrically-shaped tank sidewall, or the tank sidewall and the membrane may be part of a unitary structure. In some cases, such a membrane for a tank holding a photo-curing liquid polymer may be fashioned by thermally pressing a self-lubricant compound to form the membrane, where the membrane has a circular-shaped base portion and an anchor portion extending approximately perpendicular from a rim of the circular-shaped base portion; and subsequently removing the formed membrane from the thermal press.

BRIEF DESCRIPTION OF THE DRAWINGS

The invention is now described, by way of example and without limiting the scope of the invention, with reference to the accompanying drawings which illustrate embodiments of it, in which.

DETAILED DESCRIPTION

Figure 1:
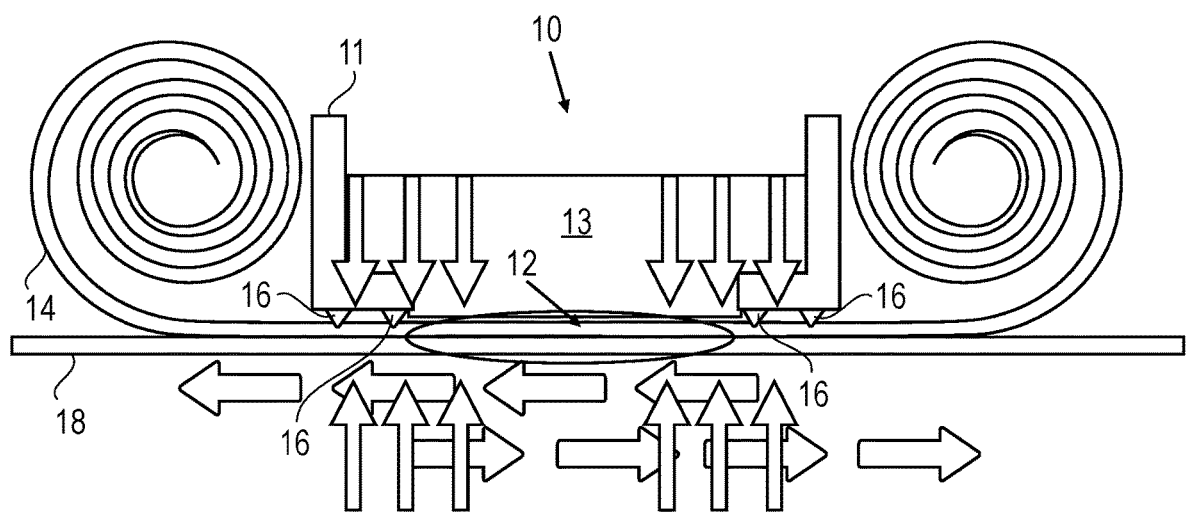
FIG. 1 depicts a 3D printing system with a rolling membrane.

FIG. 1 depicts a 3D printing system with a "rolling membrane" (i.e., unused membrane unrolled from a new roll and used membrane rolled into a used roll). Tank 10 is used to store photo-curing liquid polymer 13, which cures (i.e., hardens) upon being exposed to electromagnetic radiation at one or more frequencies corresponding to activation frequencies of photo-curing agents included in the photo-curing liquid polymer. Tank 10 is formed by a tank sidewall (also called, mask 11), and a radiation-transparent tank bottom (also called, tank window 12). Tank window 12 is transparent to said electromagnetic radiation which is capable of curing the photo-curing liquid polymer. Tank window 12 may be formed by self-lubricant membrane 14 and a borosilicate glass layer 18 disposed beneath self-lubricant membrane 14. Seals 16 may be disposed between mask 11 and self-lubricant membrane 14. Seals 16 (also called hydraulic seals), coupled with a downward force applied to mask 11 by springs (not depicted), are used to prevent photo-curing liquid polymer 13 from leaking out of tank 10.

While not depicted, it is understood that during the operation of the 3D printing system of FIG. 1, a partially formed object will be suspended in photo-curing liquid polymer 13 (e.g., by an extraction plate). Radiation will propagate through window 12 and form an image on a focal plane at or near the bottom surface of the partially formed object. The radiation will cure photo-curing liquid polymer 13, forming a cured layer which attaches to the bottom surface of the partially formed object.

A constraint present in the 3D printing system of FIG. 1 is that the radiation will experience dispersion within photo-curing liquid polymer 13. If of a sufficient degree, the dispersion will cause the image on the focal plane to become distorted and/or blurry, which is not ideal. To minimize such dispersion, the focal plane is located as close to tank window 12 as possible. One side-effect of locating the focal plane immediately above window 12 is that, in addition to the cured layer adhering to the bottom surface of the partially formed object, there is an increased chance that the cured layer will adhere to the bottom of tank 10 (i.e., adhere to the surface which forms window 12).

To reduce the degree at which the cured layer adheres to the bottom of tank 10, a "non-stick", self-lubricant membrane 14 is used to form the bottom of tank 10. Self-lubricant membrane 14 may be made from a self-lubricating polymer containing a liquid lubricant that gradually diffuses onto the surface of self-lubricant membrane 14 over time. The liquid lubricant reduces the degree at which the cured layer adheres to the bottom of tank 10. The self-lubricating polymer may be silicone and the liquid lubricant may be silicone oil. Either or both of the silicone oil and the self-lubricating polymer may be enriched with polytetrafluoroethylene (PTFE), which further increases the "non-stick" quality of self-lubricant membrane 14. Over time, however, the liquid lubricant and PTFE compound will become depleted within the portion of self-lubricant membrane 14 exposed to photocuring liquid polymer 13, reducing the "non-stick" quality of self-lubricant membrane 14.

To maintain the "non-stick" quality of self-lubricant membrane 14, mask 11 is periodically moved to an unused (or fresh) portion of self-lubricant membrane 14. Two rolls of self-lubricant membrane 14 are depicted in FIG. 1 (very much like rolls of paper towel). A first roll contains unused portions of self-lubricant membrane 14. Such roll is incrementally unrolled, and the tank slides onto the unrolled portion, allowing the tank bottom to regain its "non-stick" quality. The used portion of self-lubricant membrane 14 is then rolled into the second roll. It is noted that used portions of self-lubricant membrane 14 may be subsequently reused, upon the liquid lubricant gradually permeating onto the surface of self-lubricant membrane 14 from within the self-lubricant membrane 14. That is, after self-lubricant membrane 14 is used within mask 11, self-lubricant membrane 14 may be allowed to rest in the second roll (i.e., allowing liquid lubricant to permeate to its surface), before being reused at a later time. The time that self-lubricant membrane 14 is allowed to rest will depend on the speed at which the liquid lubricant migrates within self-lubricant membrane 14 and onto the surface of self-lubricant membrane 14.

Because borosilicate glass layer 18 has an extent that is much less than the extent of the rolls of membrane, mask 11 and borosilicate glass layer 18 need to maintain substantially the same relative horizontal positions, while self-lubricant membrane 14 slides relative to these two components. Otherwise, mask 11 may slide onto a portion of self-lubricant membrane 14 without any backing borosilicate glass layer. A stepper motor (not depicted) may be used to slide self-lubricant membrane 14 relative to mask 11 and borosilicate glass layer 18.

Several challenges associated with the 3D printing system of FIG. 1 are now described. First, it is difficult to maintain the condition and integrity of seals 16. Dust, small pieces of cured liquid polymer, and imperfections on membrane 14 (e.g., protuberances) can damage or reduce the effectiveness of seals 16, causing liquid polymer to leak out of tank 10.

Second, to increase the integrity of seals 16, springs (not depicted) are used to push mask 11 towards self-lubricant membrane 14. While the downward force does help increase the integrity of seals 16, the downward force also increases the friction that mask 11 experiences when mask 11 slides over membrane 14. This increased friction requires stepper motors (not depicted) to use an increased force to slide mask 11 over membrane 14. The increased force, however, causes stretching of membrane 14 (as membrane 14 is an elastic component), leading to an uneven thickness of membrane 14, and further weakening the integrity of seals 16.

Third, a "suction effect" is also experienced between membrane 14 and borosilicate glass layer 18. This suction effect, caused by the air-tight coupling between the smooth surface of membrane 14 and the smooth surface of borosilicate glass layer 18, is undesirable as it impedes the ability for membrane 14 to slide relative to borosilicate glass layer 18. Recall, membrane 14 needs to slide relative to borosilicate glass layer 18, in order for borosilicate glass layer 18 to maintain the same relative horizontal position relative to tank 10. To reduce the suction effect, the bottom side of membrane 14 is "scratched" (i.e., grooves are created in the bottom side of membrane 14). The scratching of the bottom side of membrane 14, however, has the unintended consequence of diffusing the radiation propagating through window 12, reducing the quality of the image formed at the focal plane, and reducing the quality of the printed object.

An improved 3D printing system with a rotating membrane is now described. In the improved 3D printing system, the "refreshing" of the membrane is no longer performed by laterally displacing the membrane relative to the tank (or more particularly, the window 12). Instead, the refreshing of the membrane is performed by rotating the membrane about an axis perpendicular to the surface of the membrane (similar to the rotation of a carousel). To reduce the chances for leakage between the membrane and the tank sidewall, the membrane is fixedly coupled to the tank sidewall (or, in some embodiments, forms the tank sidewalls itself). In this configuration, hydraulic seals are no longer disposed between the membrane and the tank sidewall inasmuch as no such seals are required. A consequence of fixedly coupling the membrane to the tank sidewall (or forming the sidewalls and the membrane as an integrated whole) is that the membrane and the tank sidewall rotate as a single unit. In other words, in order to effect rotation of the membrane, the entire tank of photo-curing liquid polymer is rotated about an axis perpendicular to the surface of the membrane. In short, the challenges caused by the use of lateral displacement of the membrane relative to the tank in the rolling system are addressed (indeed eliminated) by opting instead for rotational displacement of the membrane relative to the light projection into the tank.

The problems caused by suction effect (i.e., necessitating the scratching of the membrane bottom surface) in the rolling membrane system are addressed in the rotating membrane system by leaving the suction effect intact. That is, in the rotating membrane system, the membrane adheres to the borosilicate glass due to the suction effect (e.g., due to a friction coupling between the membrane and the borosilicate glass), and the borosilicate glass rotates synchronously with the membrane. In this arrangement, no scratching of the membrane bottom surface is needed or is present, allowing radiation to propagate through the membrane with minimal diffusion and/or distortion. Roller bearings may be used to support the glass within a housing in order to provide for free rotation of the glass.

Figure 2A:
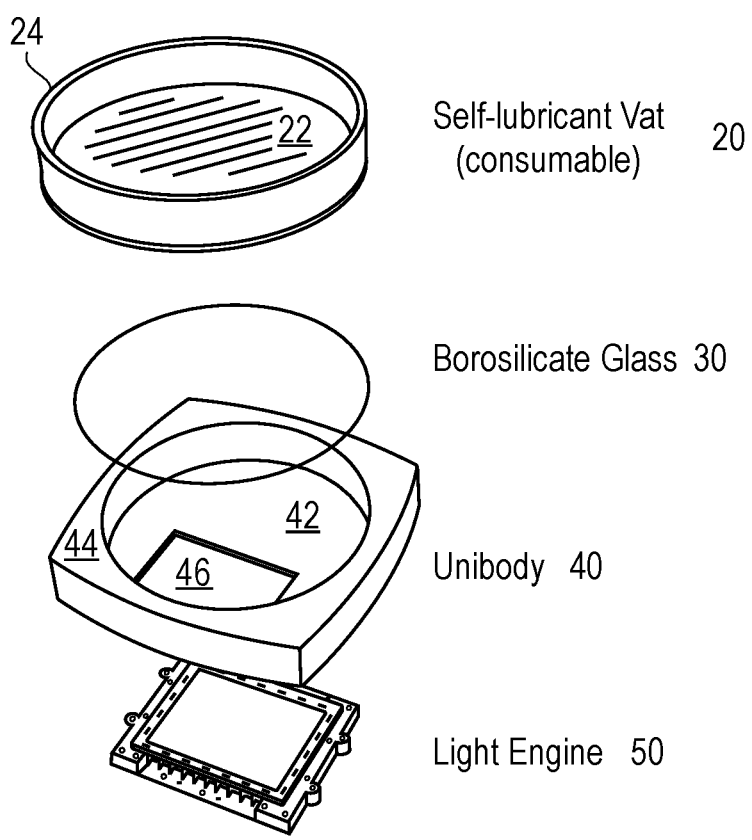
FIG. 2A depicts an exploded view of a 3D printing system with a rotating membrane, in accordance with one embodiment of the invention.

An exploded view of the 3D printing system with the rotating membrane is depicted in FIG. 2A, in accordance with one embodiment of the invention. Tank 20 (also called a self-lubricant vat) may be formed by cylindrical-shaped tank sidewall 24 and circular-shaped membrane 22. The material composition of membrane 22 may be similar to the above-described material composition of membrane 14. Similar to membrane 14, membrane 22 is transparent to radiation at frequencies which are capable of curing the photo-curing liquid polymer. As mentioned above, membrane 22 is fixedly coupled to tank sidewall 24 (e.g., via a friction coupling or other coupling means), or in some instances the entire tank may be formed of the same material used for membrane 22. The coupling between membrane 22 and tank sidewall 24 is also fluid tight so that the photo-curing liquid polymer does not leak out from tank 20. Membrane 22 (or the entire tank 20 in cases where the tank and membrane are formed as an integrated unit) may be a "consumable", meaning that it can be replaced when it wears out (e.g., when it loses its non-stick quality or its oil becomes depleted) to permit a continuous or stepping 3D printing process, much like a printer head is replaced when a printer head runs out of ink or a razor blade of a razor is replaced when the razor is no longer sharp.

Circular-shaped disk 30 is disposed beneath membrane 14. Circular-shaped disk 30 is formed from a rigid material which structurally supports the bottom of tank 20 (i.e., which is needed as membrane 22 is formed from an elastic material). Circular-shaped disk 30 is also transparent to radiation which is capable of curing the photo-curing liquid polymer. In a preferred embodiment, circular-shaped disk 30 is formed from borosilicate glass.

Tank 20 and circular-shaped disk 30 may be received in a cavity of frame 40 (also called a unibody). In a preferred embodiment, frame 40 is formed as a unibody, meaning that it is formed as a single moulded assembly. Frame 40 may comprise a frame sidewall 44 with a cylindrical central cavity, base portion 42 including a circular-shaped rim above which circular-shaped disk 30 is disposed. The circular-shaped rim of base portion 42 may include a radiation-transparent printing window 46. In a preferred embodiment, radiation-transparent printing window 46 is formed as a cutout in base portion 42 and is positioned at an off-center location (i.e., at a location away from the center of the circular-shaped rim). The off-center location of the radiation-transparent printing window 46 allows a rotation of tank 20 to cause a new region of membrane 22 (i.e., a region of membrane 22 different from the region of membrane 22 currently over the printing window) to rotate over radiation-transparent printing window 46.

Light engine 50 may be disposed within or immediately below printing window 46. Light engine 50 may emit collimated rays of electromagnetic radiation which form an image that is used to cure the resin in tank 20 immediately above membrane 22.

Figure 2B:
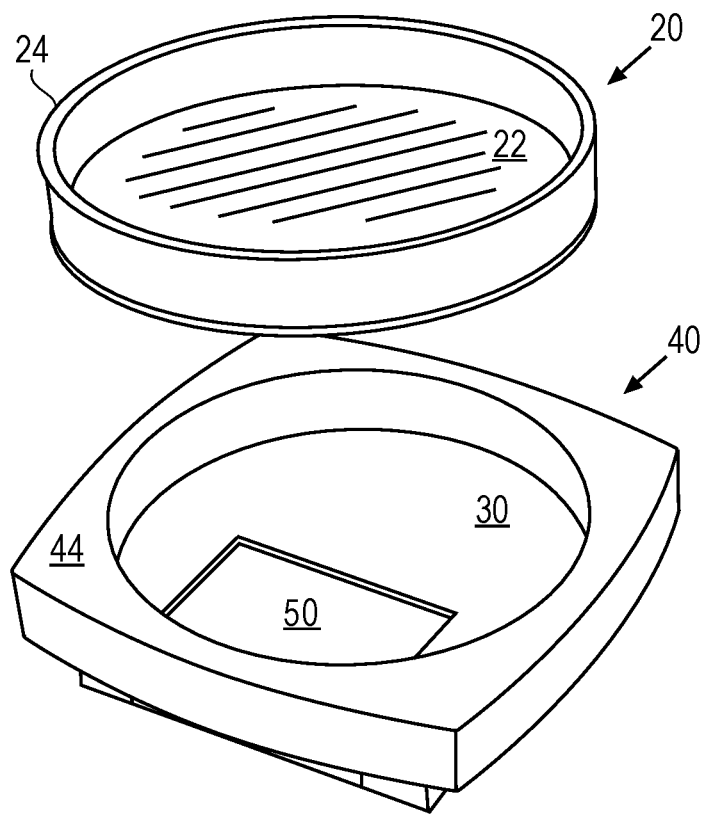
FIG. 2B depicts a partially exploded view of a 3D printing system with a rotating membrane, in accordance with one embodiment of the invention.

A partially exploded view of a 3D printing system with a rotating membrane is depicted in FIG. 2B, in accordance with one embodiment of the invention. In FIG. 2B, circular-shaped disk 30 has been inserted into the cavity of frame 40 (e.g., where it may be supported circumferentially by roller bearings (not shown)) and light engine 50 is disposed immediately adjacent to printing window 46. Light engine 50 is visible through circular-shaped disk 30. Tank 20 is shown separately from frame 40, but it is understood that in a fully assembled form, tank 20 would also be inserted into the cavity of frame 40, directly over circular-shaped disk 30. In the fully assembled form, frame sidewall 44 completely surrounds tank sidewall 24.

Figure 3A:
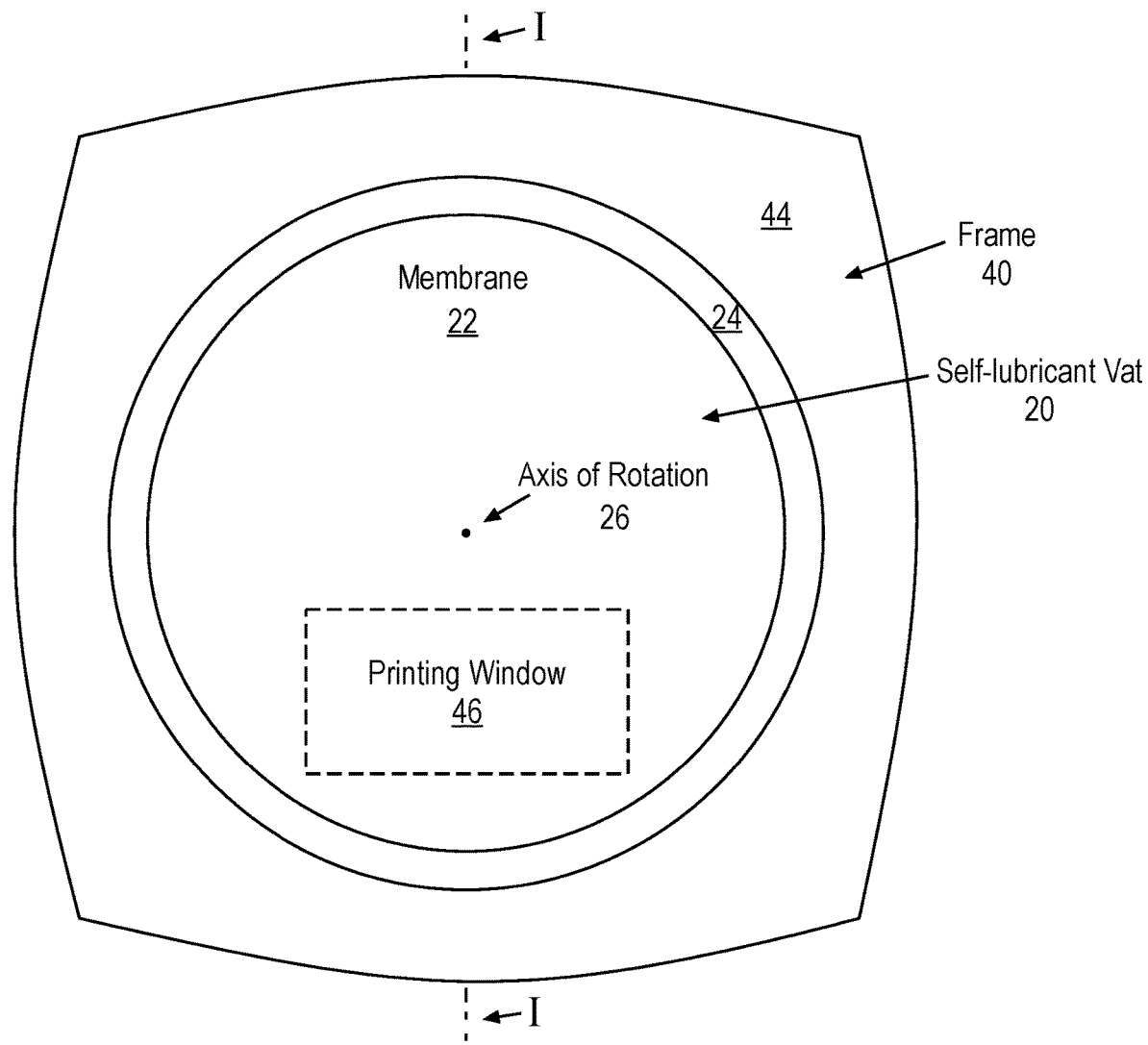
FIG. 3A depicts a top view of a 3D printing system with a rotating membrane, in accordance with one embodiment of the invention.

FIG. 3A depicts a top view of the 3D printing system with rotating membrane 22, in accordance with one embodiment of the invention. Visible in the top view are the top surface of frame sidewall 44, the top surface of tank sidewall 24 and the top surface of membrane 22. As described above, tank sidewall 24 and membrane 22 are part of tank 20. The axis of rotation 26 of membrane 22 as well as the axis of rotation 26 of tank 20 are shown as a point in the center of membrane 22. If not already apparent, the axis of rotation 26 is perpendicular to membrane 22. The outline of printing window 46 (disposed under membrane 22) is depicted in dashed lines. As depicted in FIG. 3A, tank 20 fits snugly into the cavity of frame 40, and hardly any gap is present between tank sidewall 24 and frame sidewall 44.

Figure 3B:
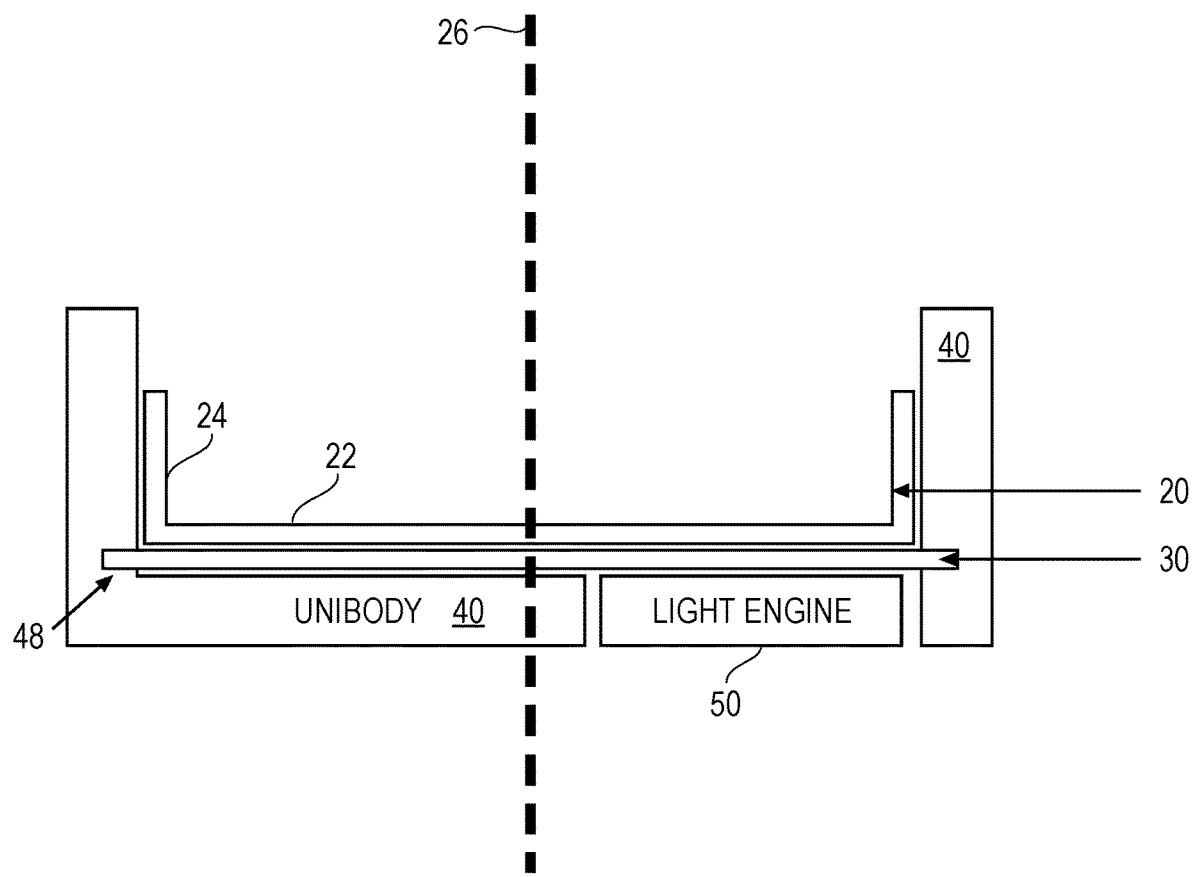
FIG. 3B depicts a cross-section of the 3D printing system along line I-I, in accordance with one embodiment of the invention.

FIG. 3B depicts a cross-section of the 3D printing system along line I-I (depicted in FIG. 3A), in accordance with one embodiment of the invention. As shown in the cross-section, tank 20 and circular-shaped disk 30 are disposed in a cavity of frame 40. In operation, tank 20 and circular-shaped disk 30 rotate about axis of rotation 26 (while frame 40 is stationary). Light engine 50 is disposed in (or immediately adjacent to) printing window 46 of frame 40. Groove 48 may be present in frame sidewall 44, and such groove may receive the rim of circular-shaped disk 30. As such, circular-shaped disk 30 may be suspended over base portion 42, minimizing the friction that circular-shaped disk 30 experiences while rotating within the cavity of frame 40. In another embodiment (not depicted), ball bearings may be present in groove 48, additionally minimizing the friction experienced by circular-shaped disk 30. In yet another embodiment (not depicted), no groove may be present, and circular-shaped disk 30 may rest upon the upper surface of base portion 42. In such an embodiment, it would be critical for the upper surface of base portion 42 to be free of dust or other particles, in order to prevent the surface of circular-shaped disk 30 from being scratched.

Figure 3C:
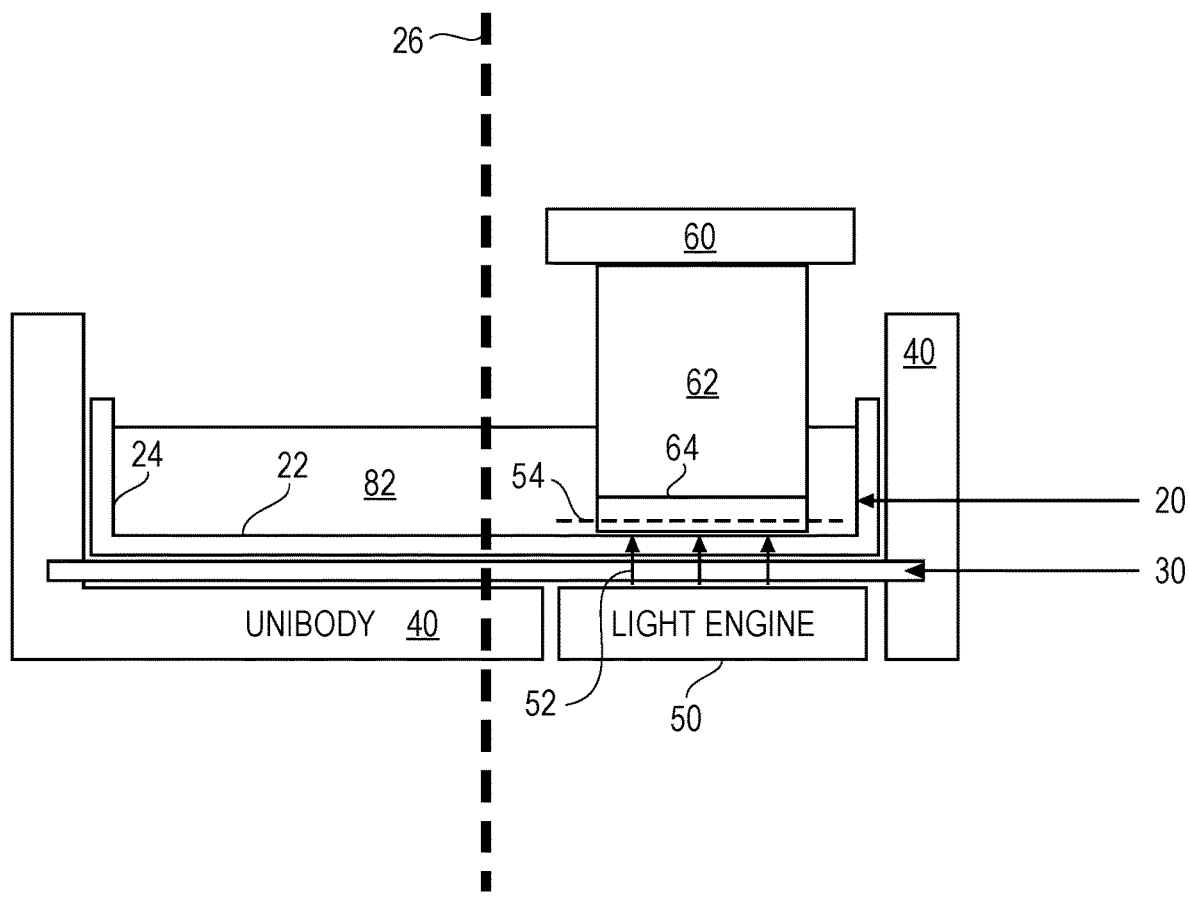
FIG. 3C depicts the cross-section of FIG. 3B while the 3D printing system is in the process of forming an object, in accordance with one embodiment of the invention.

FIG. 3C depicts the cross-section of FIG. 3B while the 3D printing system is in the process of forming an object, in accordance with one embodiment of the invention. As shown in the cross-section, photo-curing liquid polymer 82 is present within tank 20, and photo-curing liquid polymer 82 may be substantially similar to photo-curing liquid polymer 13 used in the rolling-membrane printing system of FIG. 1. Partially formed 3D object 62 is suspended in photo-curing liquid polymer 82 by extraction plate 60 (which in turn may be attached to a height adjusting means, not depicted). Radiation 52 from light engine 50 propagates through circular-shaped disk 30, membrane 22, photo-curing liquid polymer 82 and forms an image on focal plane 54. One will notice that axis of rotation 26 is parallel to the propagation direction of radiation 52. Cured layer 64 forms in focal plane 54 (due to the interaction between the radiation and photo-curing agents included in the photo-curing liquid polymer), and such cured layer 64 attaches to the bottom surface of partially formed 3D object 62. Cured layer 64 does not strongly attach to membrane 22 due to the "non-stick" properties of membrane 22. If not already apparent, a top portion of tank 20 is unsealed so as to allow extraction plate 60 to extract object 62 at least partially formed within photo-curing liquid polymer 82. It is also noted that one effect of membrane 22 is to displace the location at which resin would be cured in the absence of membrane 22 (i.e., prevents cured resin from forming on borosilicate glass 30).

Figure 4A:
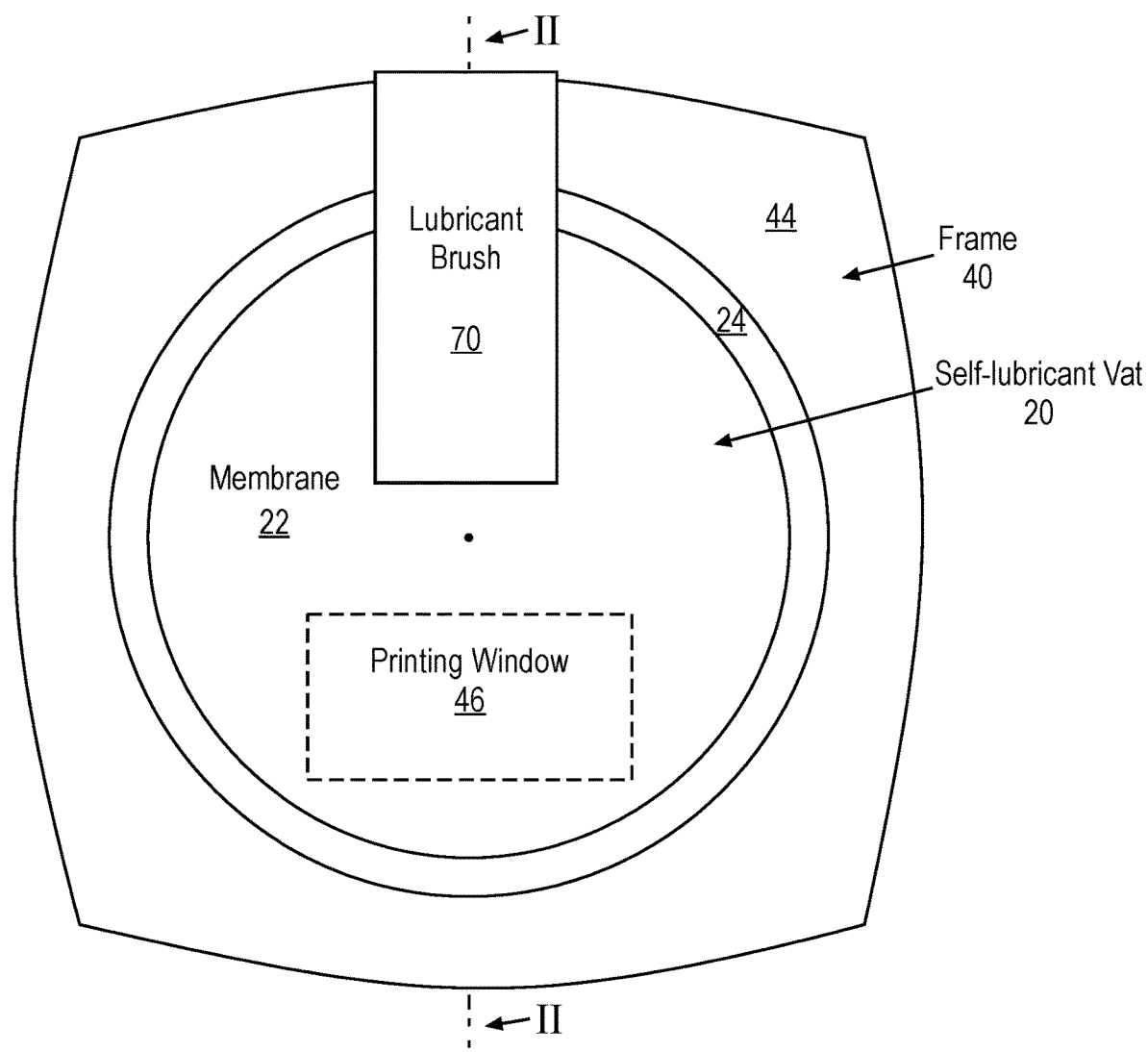
FIG. 4A depicts a top view of a 3D printing system with a rotating membrane and a lubricant brush, in accordance with one embodiment of the invention.

FIG. 4A depicts a top view of a 3D printing system with rotating membrane 22 and lubricant brush 70, in accordance with one embodiment of the invention. The embodiment of FIG. 4A is substantially identical to the embodiment of FIG. 3A, except that the embodiment of FIG. 4A includes lubricant brush 70 disposed over a region of membrane other than the membrane region above printing window 46. Lubricant brush 70 is used to spread a lubricant (also supplied by the lubricant brush) over the surface of membrane 22. The spreading may be accomplished by membrane 22 rotating relative to a stationary lubricant brush 70 which contacts the surface of membrane 22. The lubricant dispensed by lubricant brush 70 may be identical to the lubricant present within membrane 22 (e.g., silicone oil), and thus may help to replenish the lubricants within and on membrane 22, in turn extending the lifetime of membrane 22. Typically, lubricant is spread over the surface of membrane 22 while tank 20 is empty of photo-curing liquid polymer.

Figure 4B:
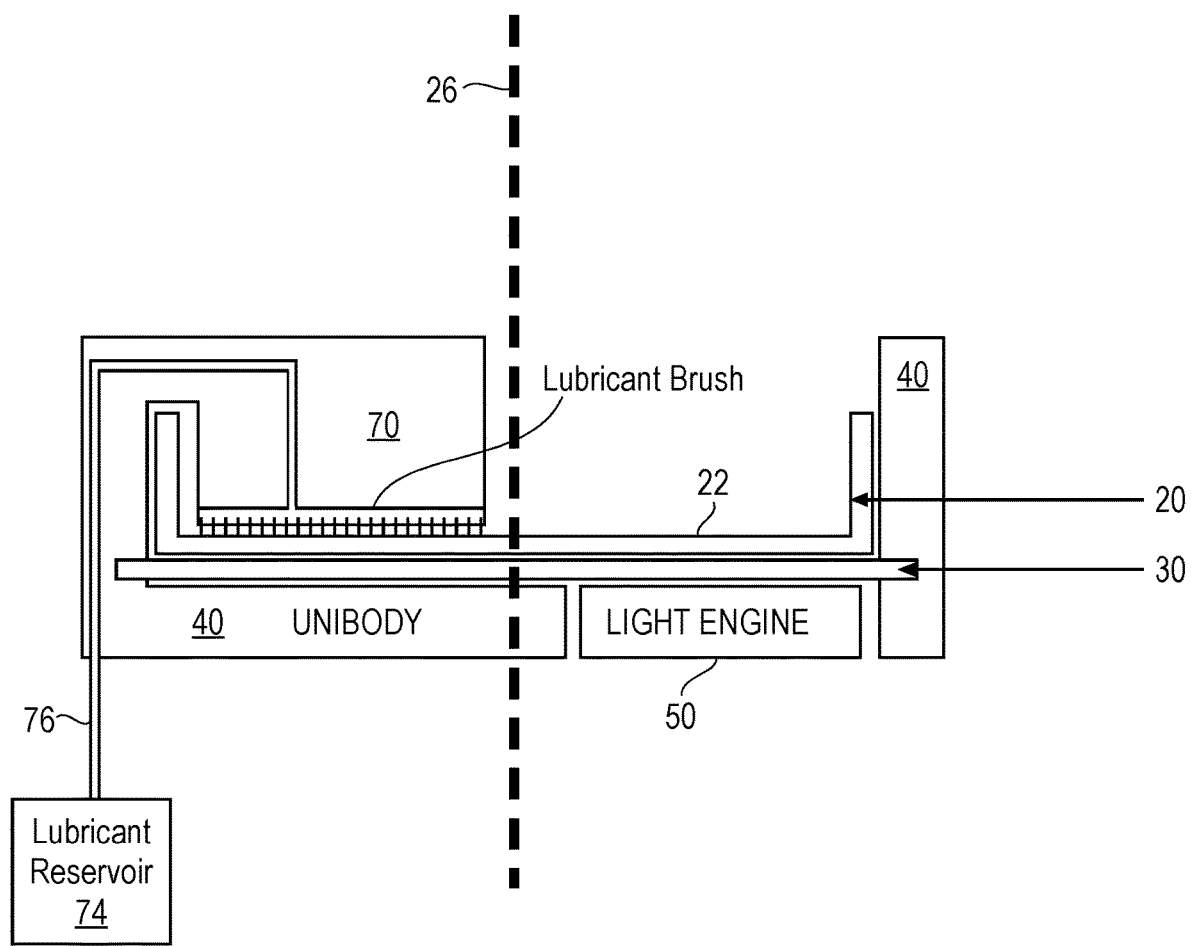
FIG. 4B depicts a cross-section of the 3D printing system along line II-II, in accordance with one embodiment of the invention.

FIG. 4B depicts a cross-section of the 3D printing system along line II-II (depicted in FIG. 4A), in accordance with one embodiment of the invention. As shown in the cross-section, lubricant brush 70 contacts the surface of membrane 22, and may be used to spread lubricant over the surface of membrane 22. As further shown, lubricant brush 70 may contain channel 76 for delivering lubricant from lubricant reservoir 74 to the surface of membrane 22.

Figure 4C:
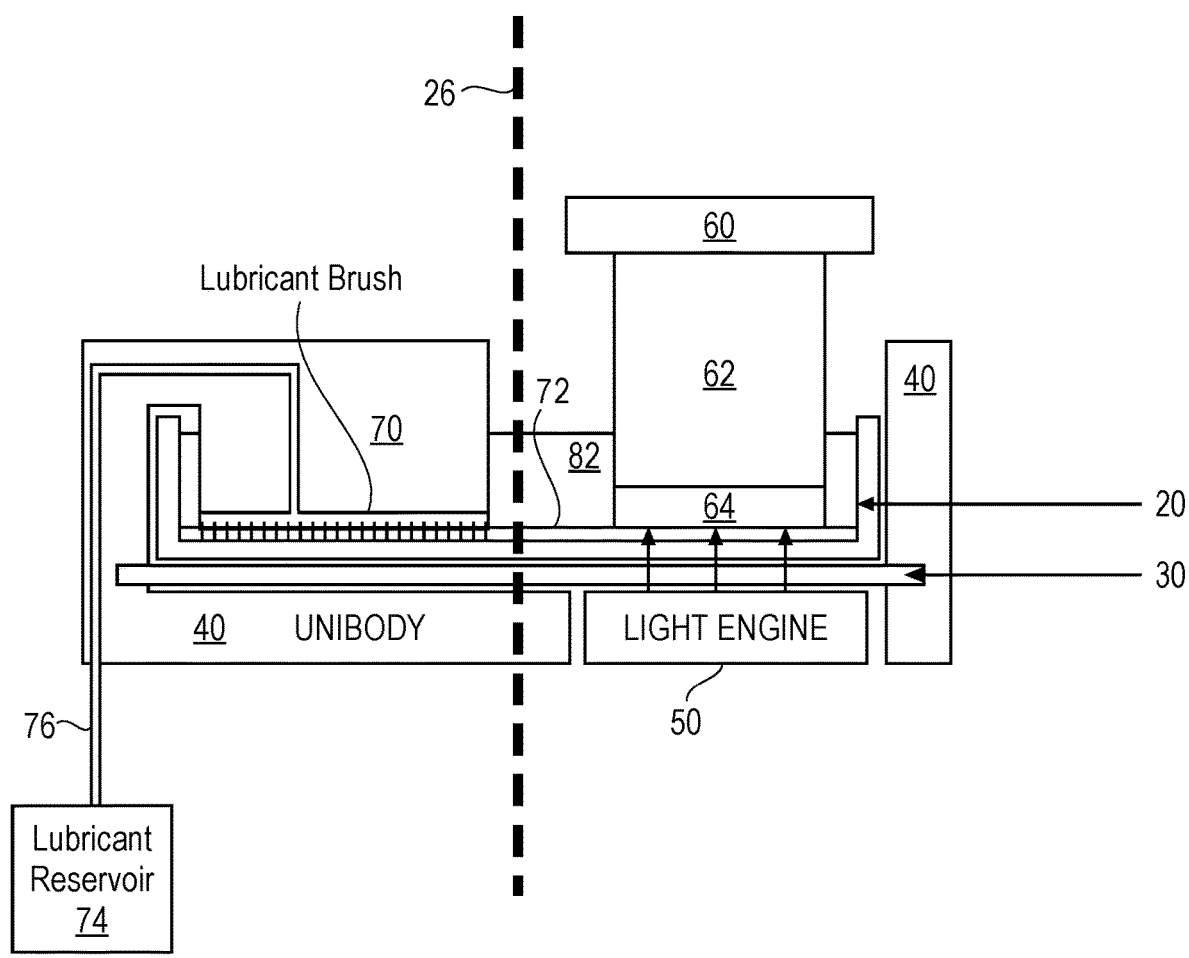
FIG. 4C depicts the cross-section of FIG. 4B while the 3D printing system is in the process of forming an object, in accordance with one embodiment of the invention.

FIG. 4C depicts the cross-section of FIG. 4B while the 3D printing system is in the process of forming an object, in accordance with one embodiment of the invention. As shown in the cross-section, a thin layer of lubricant 72 has been spread over the surface of membrane 22, and such layer of lubricant 72 substantially prevents cured layer 64 from attaching onto membrane 22. While not depicted in FIGS. 4A-4C, lubricant brush may also include a channel for draining photo-curing liquid polymer 82 from tank 20. The draining of liquid polymer may be performed prior to spreading the lubricant onto the surface of membrane 22.

Figure 5A:
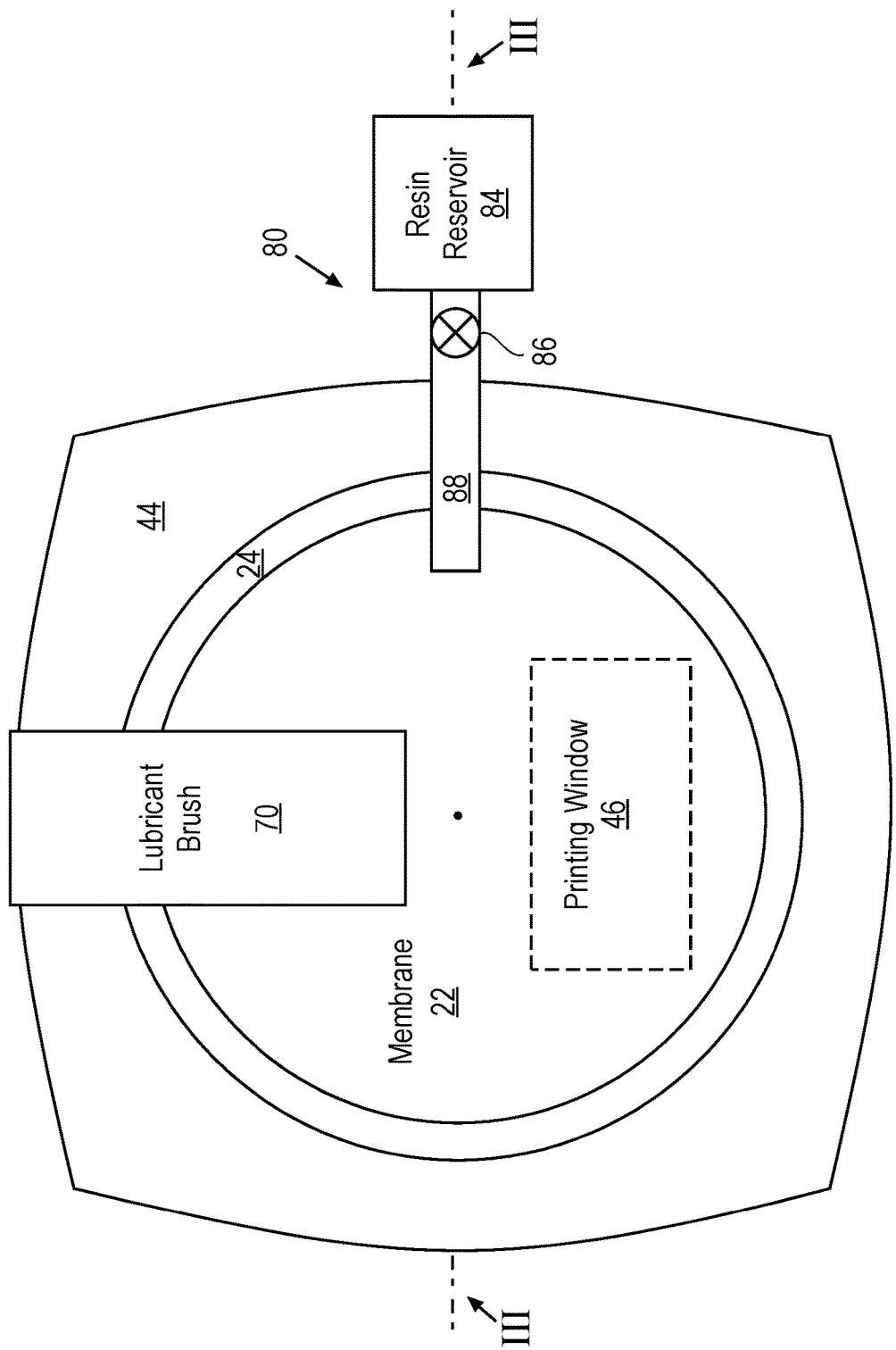
FIG. 5A depicts a top view of a 3D printing system with a rotating membrane, lubricant brush and photo-curing liquid polymer dispensing means, in accordance with one embodiment of the invention.

FIG. 5A depicts a top view of a 3D printing system with rotating membrane 22, lubricant brush 70 and photo-curing liquid polymer dispensing means 80, in accordance with one embodiment of the invention. As shown, photo-curing liquid polymer dispensing means 80 may comprise a photo-curing liquid polymer reservoir 84 (e.g., a "resin reservoir" as depicted). The photo-curing liquid polymer may be supplied to tank 20 via channel 88. The rate and time at which photo-curing liquid polymer is supplied to tank 20 may be controlled by valve 86.

Figure 5B:
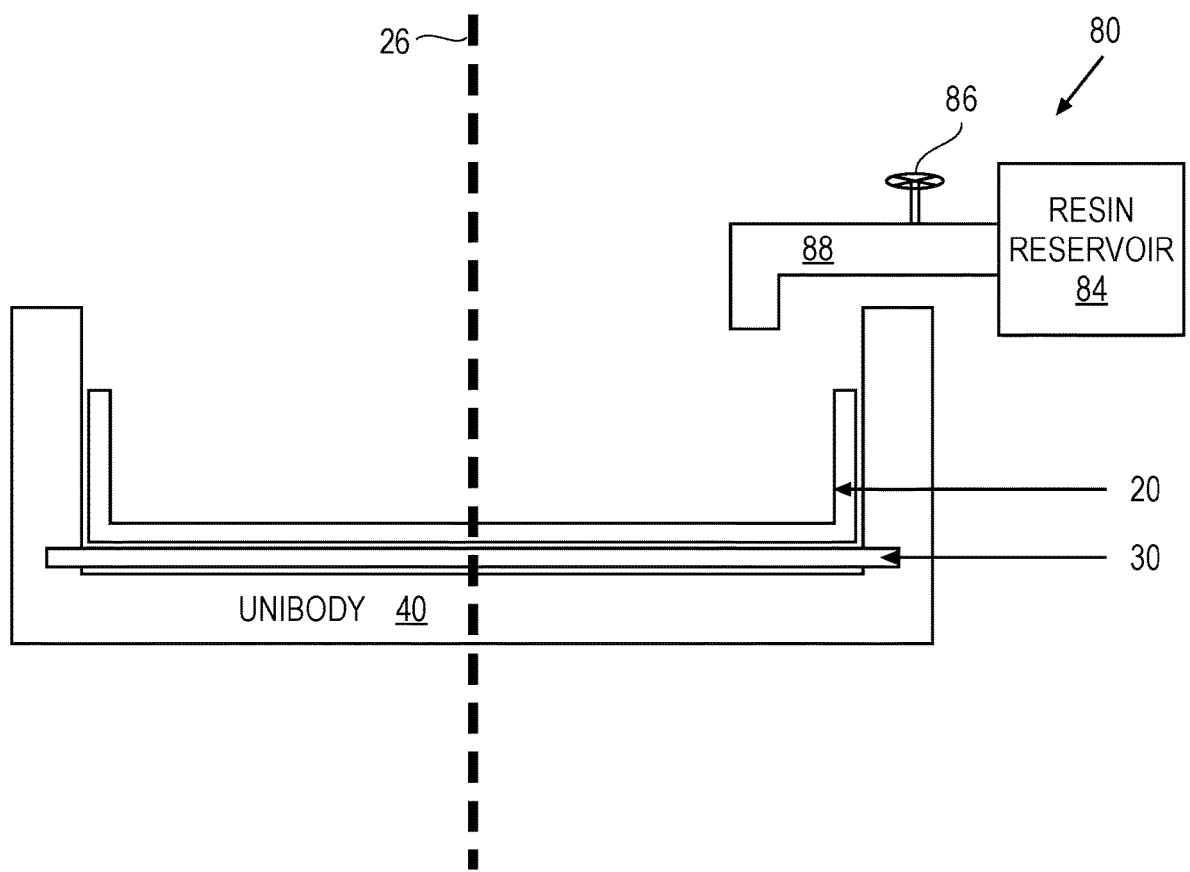
FIG. 5B depicts a cross-section of the 3D printing system along line III-III, in accordance with one embodiment of the invention.

FIG. 5B depicts a cross-section of the 3D printing system along line III-III (depicted in FIG. 5A), in accordance with one embodiment of the invention. As shown, resin may be supplied to tank 20 from resin reservoir 84 via channel 88, and the flow of resin may be controlled by valve 86.

Figure 5C:
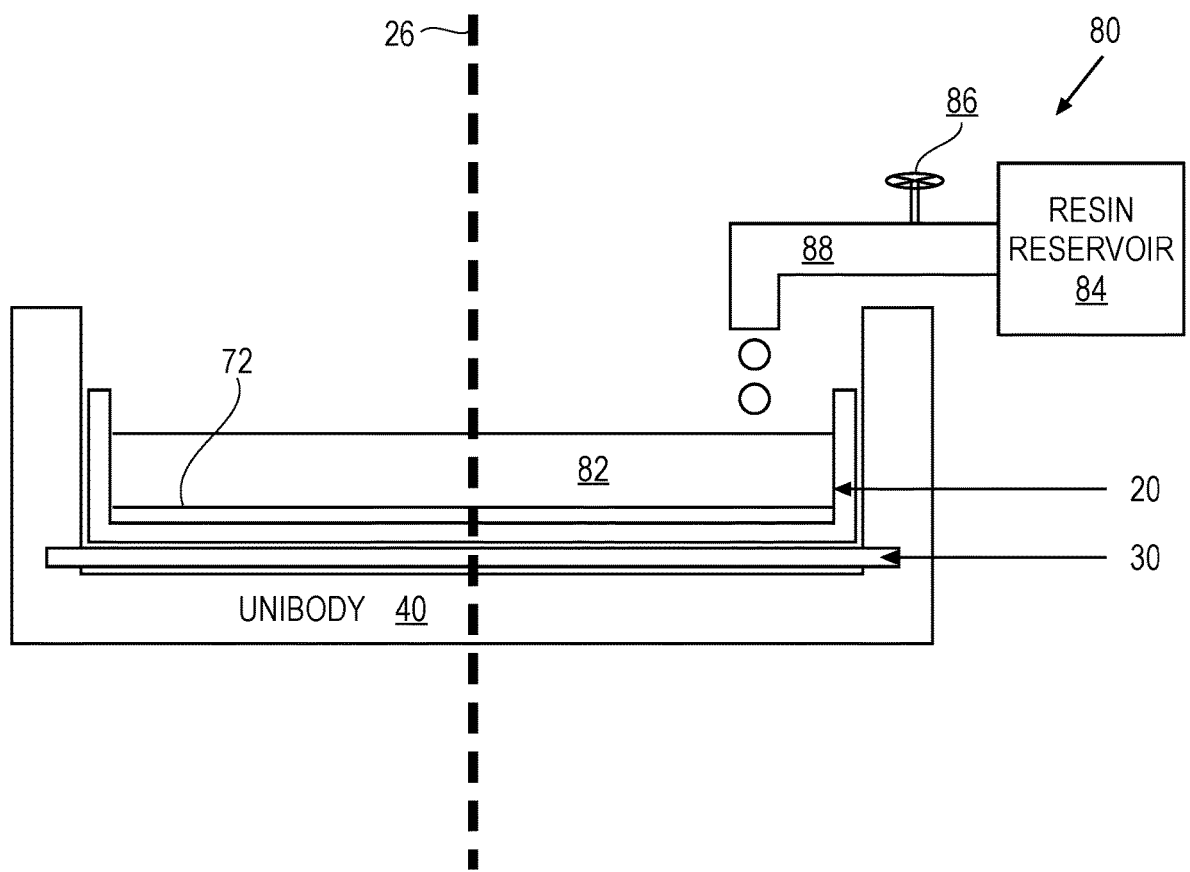
FIG. 5C depicts the cross-section of FIG. 5B while the 3D printing system is in the process of forming an object, in accordance with one embodiment of the invention.

FIG. 5C depicts the cross-section of FIG. 5B while the 3D printing system is in the process of forming an object, in accordance with one embodiment of the invention. As shown, photo-curing liquid polymer 82 is being dispensed from resin reservoir 84 via channel 88. In another embodiment (not depicted), lubricant brush may be used to dispense lubricant as well as resin, and in that embodiment a separate resin dispensing means may not be present.

Figure 6:
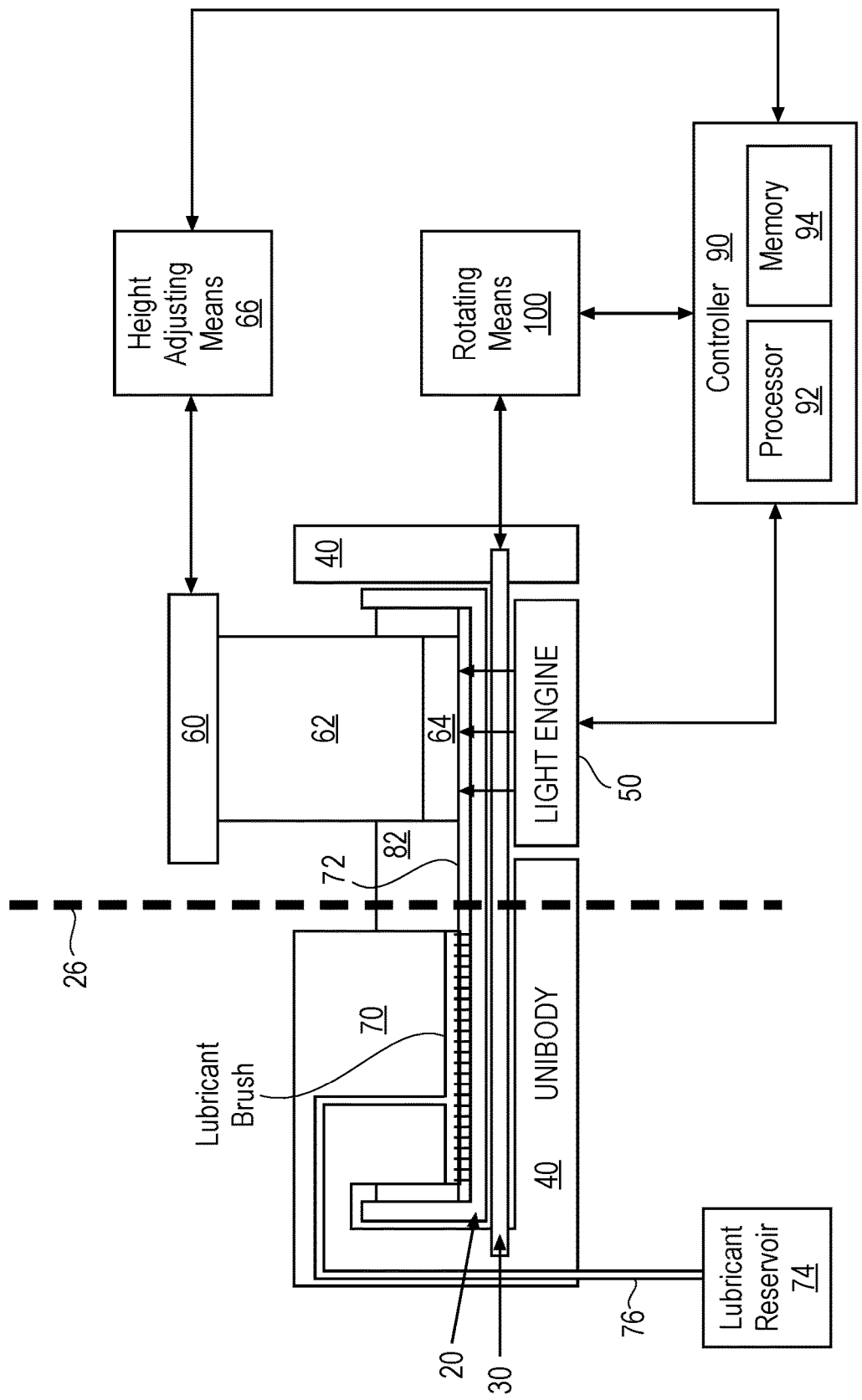
FIG. 6 depicts a controller communicatively coupled to the light engine, rotating means and height adjusting means of a 3D printing system, in accordance with one embodiment of the invention.

FIG. 6 depicts controller 90 communicatively coupled to light engine 50, rotating means 100 and height adjusting means 66 of a 3D printing system, in accordance with one embodiment of the invention. Controller 90 may comprise processor 92 and memory 94. Memory 94 may store instructions which, when executed by processor 92, cause processor 92 to control various components (e.g., light engine 50, rotating means 100, height adjusting means 66) of the 3D printing system. For example, controller 90 may provide light engine with a sequence of images, which are in turn successively projected onto the focal plane. For example, controller 90 may control an angular displacement that rotating means 100 imparts on tank 20 and/or circular-shaped disk 30. For example, controller 90 may control the vertical displacement that height adjusting means 66 imparts on extraction plate 60. While not depicted in FIG. 6, controller 90 may additionally control lubricant brush 70 (e.g., control when lubricant is dispensed, control the amount of lubricant that is dispensed, receive a measurement of the lubricant that is present on the surface of membrane 22, etc.). While not depicted in FIG. 6, controller 90 may additionally control valve 86 of photo-curing liquid polymer dispensing means (e.g., control when resin is dispensed, control the amount of resin that is dispensed, etc.). In addition, a sensor may be present on tank 20 to detect a level of photo-curing liquid polymer in tank 20, and a measurement of the resin level within tank 20 may be used by controller 90 to determine whether additional resin should be dispensed from resin reservoir 84.

Further details are now provided regarding rotating means 100. In one embodiment, rotating means 100 may include a stepper motor and a transmission system having an end effector. Rotational motion produced by the stepper motor may be delivered via the transmission system to the rim of circular-shaped disk 30 and/or tank sidewall 24 by the end effector via a friction coupling or via a geared coupling. In another embodiment, rotating means 100 are included in frame 40, and rotational motion is imparted onto tank 20 via a magnetic coupling between rotating means 100 and tank sidewall 24.

Figure 7:
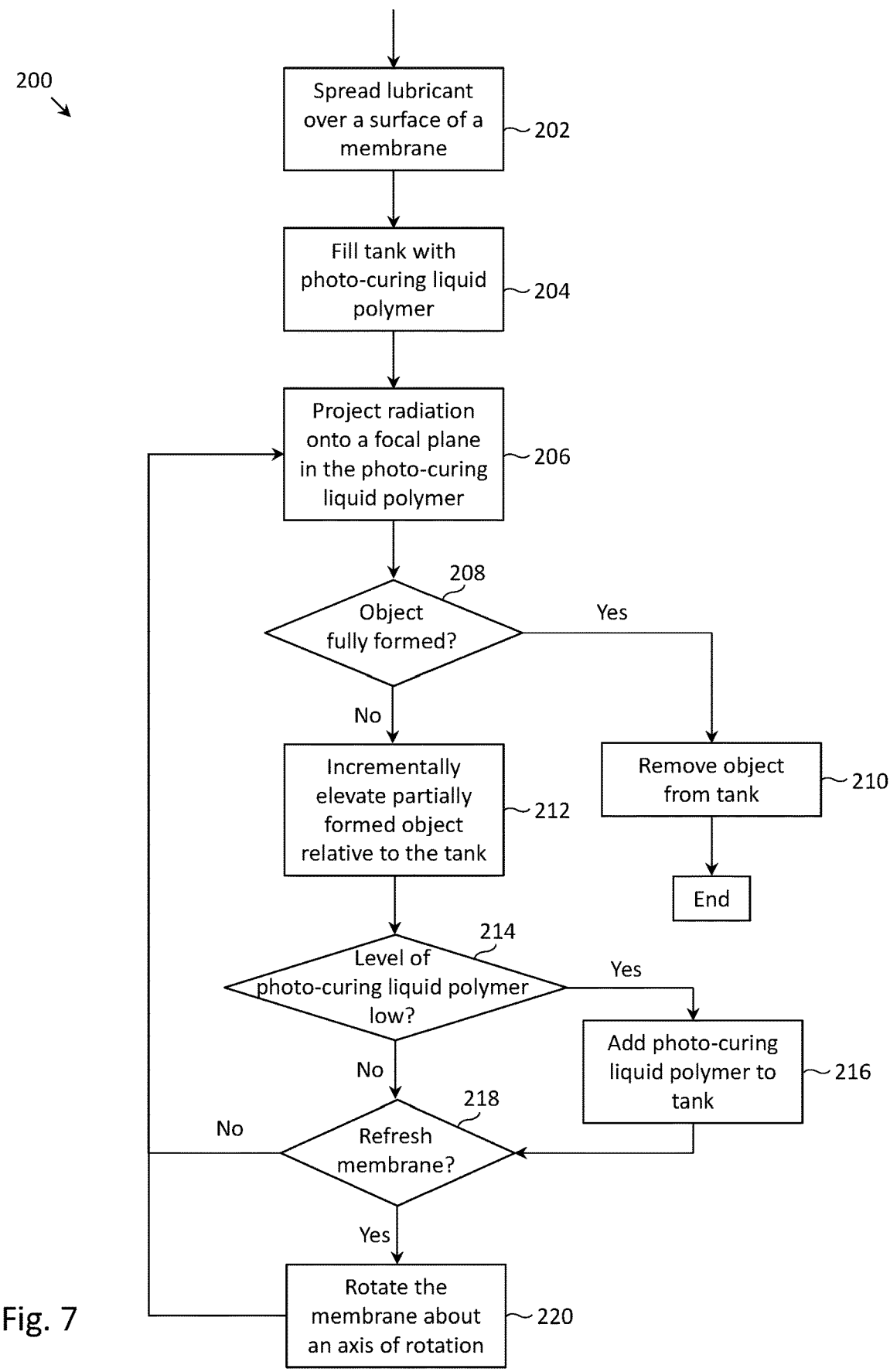
FIG. 7 depicts a flow chart of a process to operate a 3D printing system, in accordance with one embodiment of the invention.

FIG. 7 depicts a flow chart of process 200 to operate a 3D printing system, in accordance with one embodiment of the invention. Process 200 may be performed in an automated manner by controller 90 depicted in FIG. 6. At step 202, a lubricant (e.g., silicone oil) may be spread over a surface of membrane 22. As described above, the lubricant may be dispensed onto the surface of membrane 22 by lubricant brush 70, and rotation of membrane 22 may cause the dispensed lubricant to be spread over the surface of membrane 22 by lubricant brush 70.

At step 204, tank 20 may be filled with photo-curing liquid polymer 82. As described above, controller 90 may control the amount of photo-curing liquid polymer that is dispensed, as well as the rate at which it is dispensed.

At step 206, light engine 50 may project radiation through printing window 46 of frame 40, through circular-shaped disk 30, and through membrane 22, forming an image on a focal plane located in photo-curing liquid polymer 82. The data encoding for the image may be provided by controller 90.

At step 208, controller 90 may determine whether the object is fully formed (e.g., whether the last image in a series of images has been sent to light engine 50). If so, the object is removed from tank 20 by extraction plate 60 (step 210), and process 200 ends. Otherwise, the partially formed object 62 is incrementally elevated relative to tank 20 (step 212).

At step 214, controller 90 may determine whether the level of photo-curing liquid polymer is low, for example via a sensor that senses the level of photo-curing liquid polymer. If so, photo-curing liquid polymer is added to tank 20 (step 216). Otherwise, the process continues to step 218.

At step 218, controller 90 may determine whether membrane 22 needs to be refreshed (i.e., rotated). In one embodiment, membrane 22 is refreshed every time after a cured layer is formed. In that instance, step 218 will always evaluate to true and the process will proceed to step 220. In another embodiment, membrane 22 is refreshed after a threshold number of cured layers have been formed (e.g., 5, 10, 100, etc.). In that instance, step 218 will evaluate to false if the threshold number of cured layers has not been reached, and will evaluate to true if the threshold number of cured layers has been reached.

If step 218 evaluates to true, the process proceeds to step 220 in which membrane 22 rotates by a certain angle about its axis of rotation. Following the rotation of membrane 22 or upon step 218 evaluating to false, process 200 continues to step 206 in which an additional cured layer is formed.

While not depicted in FIG. 7, a counter (e.g., instantiated in controller 90) may count the number of rotations that membrane 22 has rotated. Upon the number of rotations reaching a threshold (e.g., 1, 2, 3, etc.), tank 20 may be replaced with a new tank 20. In another embodiment, a sensor may periodically measure the "non-stick" quality of membrane 22 (e.g., uniformity of lubricant layer 72, etc.). Upon the non-stick quality of membrane 22 deteriorating to a threshold degree, tank 20 may be replaced with a new tank 20. It is noted that the process of replacing the tank with a new tank may be conveniently performed by an operator of the 3D printing system. Without gloves, the operator can remove the old tank from the cavity of the frame (leaving circular-shaped disk 30 in place) and insert a new tank into the cavity. Since tank 20 is fluid-tight, no clean-up of spilled photo-curing liquid polymer (on circular-shaped disk 30 or frame 40) should be necessary. In an embodiment of the 3D printing system with lubricant brush 70, lubricant brush 70 may need to be first removed before the tank 20 is replaced.

It is understood that process 200 of FIG. 7 is merely one way to operate the 3D printing system, and that order of steps may be varied. For example, for a faster printing speed, the elevating of the partially formed object (step 212) and the rotation of the membrane (step 220) may be performed at the same time. As another example, the elevating of the partially formed object (step 212), the rotation of the membrane (step 220) and the dispensing of photo-curing liquid polymer into the tank (step 216) may be performed at the same time.

Figure 8:
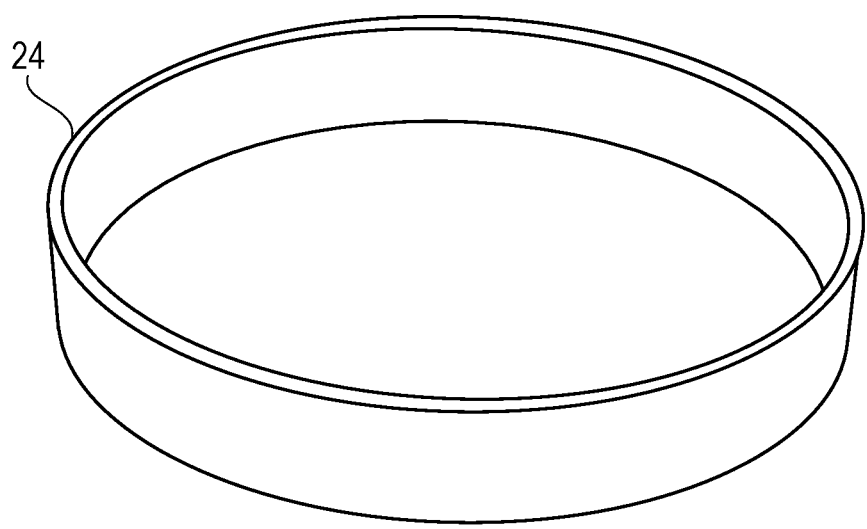
FIG. 8 depicts a perspective view of a tank sidewall, in accordance with one embodiment of the invention.

FIGS. 8-15 describe a process to manufacture tank 20. FIG. 8 depicts a perspective view of tank sidewall 24 (also called a circular support), in accordance with one embodiment of the invention. Tank sidewall 24 may be fabricated by pouring a thermo-hardening material into a mold and then heating the mold to harden the thermo-hardening material.

Figure 9:
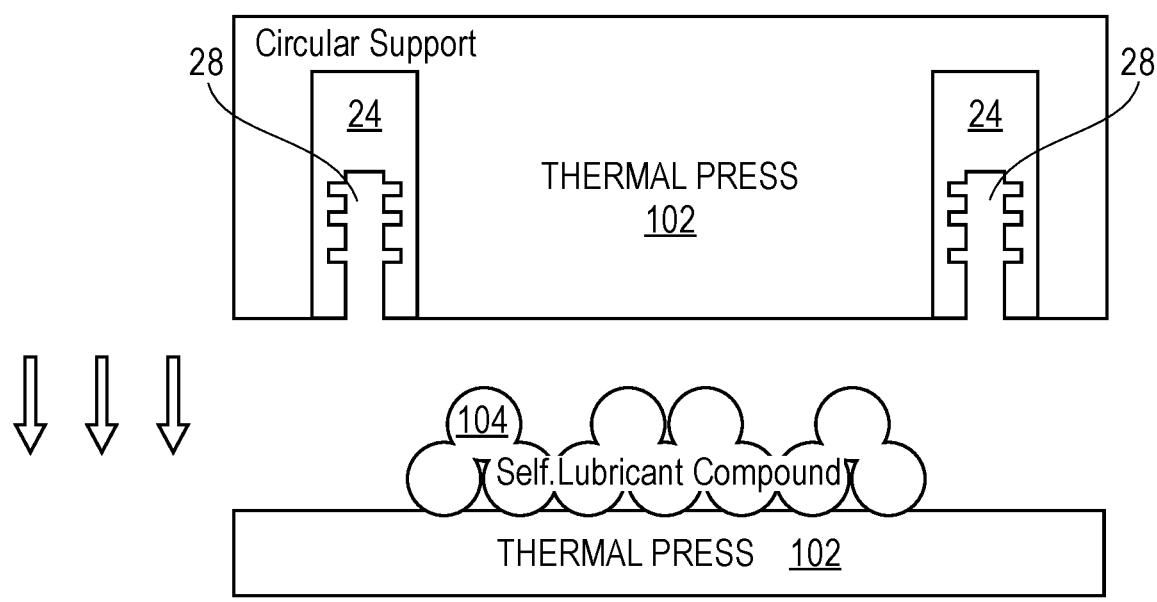
FIG. 9 depicts a cross sectional view of a thermal press with tank sidewall inserted into a top plate of the thermal press, in accordance with one embodiment of the invention.

FIG. 9 depicts a cross sectional view of thermal press 102 with tank sidewall 24 inserted into a top plate of thermal press 102. Tank sidewall 24 may contain cavity 28 for receiving an anchor portion of membrane 22, and cavity 28 may contain grooves for such anchor portion of membrane 22 to securely attach to tank sidewall 24. Self-lubricant compound 104 (e.g., silicone) is applied between the two plates of thermal press 102 shortly before the two plates of thermal press 102 are pressed together.

Figure 10:
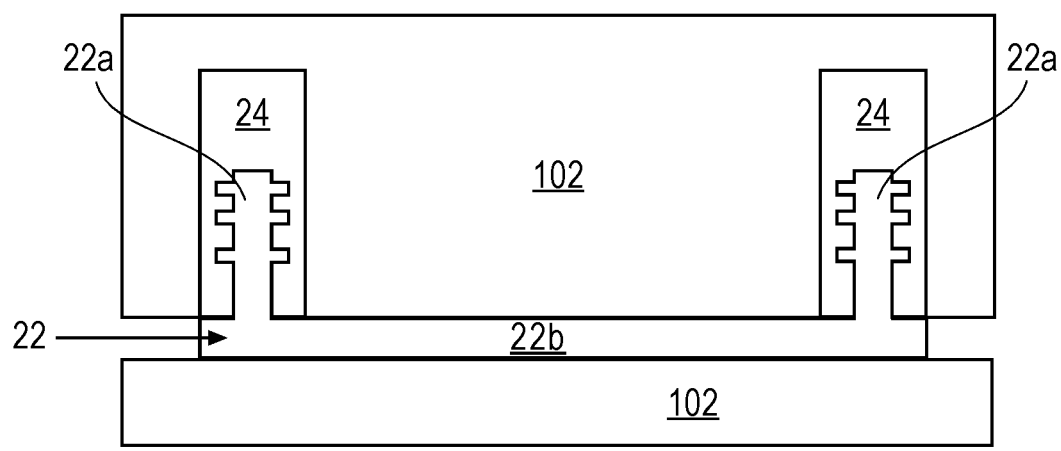
FIG. 10 depicts a cross sectional view of the thermal press after the two plates of the thermal press have been pressed together and heated, in accordance with one embodiment of the invention.

FIG. 10 depicts a cross sectional view of thermal press 102 after the two plates of thermal press 102 have been pressed together and heated. Self-lubricant compound 104 is pushed into cavity 28, forming anchor portion 22a of membrane 22. Self-lubricant compound 104 is also flattened, by the flat plate portions of thermal press 102, into base portion 22b of membrane 22.

Figure 11:
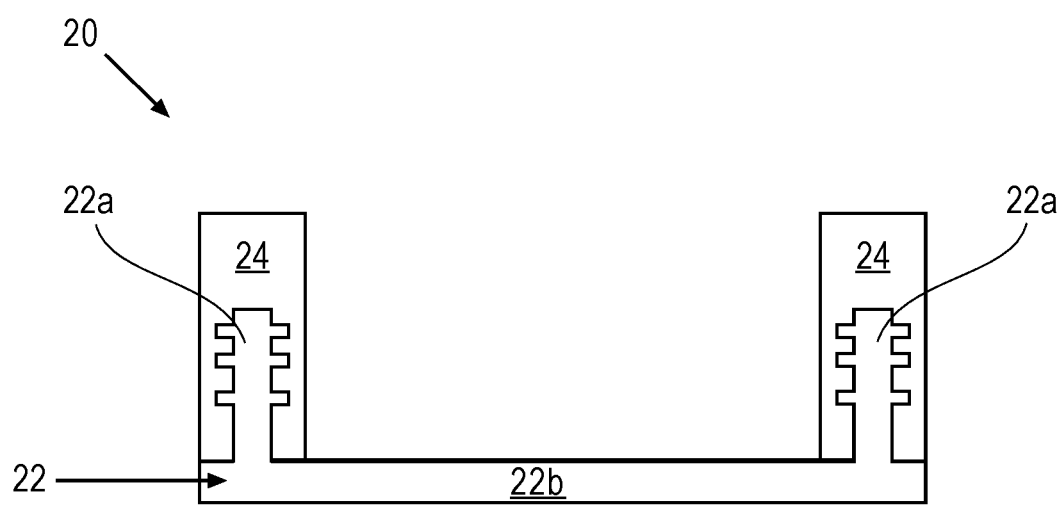
FIG. 11 depicts a cross sectional view of the tank after the tank has been extracted from the thermal press, in accordance with one embodiment of the invention.

FIG. 11 depicts a cross sectional view of tank 20 after tank 20 has been extracted from thermal press 102. Membrane 22 is fixedly attached to a rim of tank sidewall 24 via anchor portion 22a which extends in a perpendicular direction from base portion 22b of membrane 22.

Figure 12:
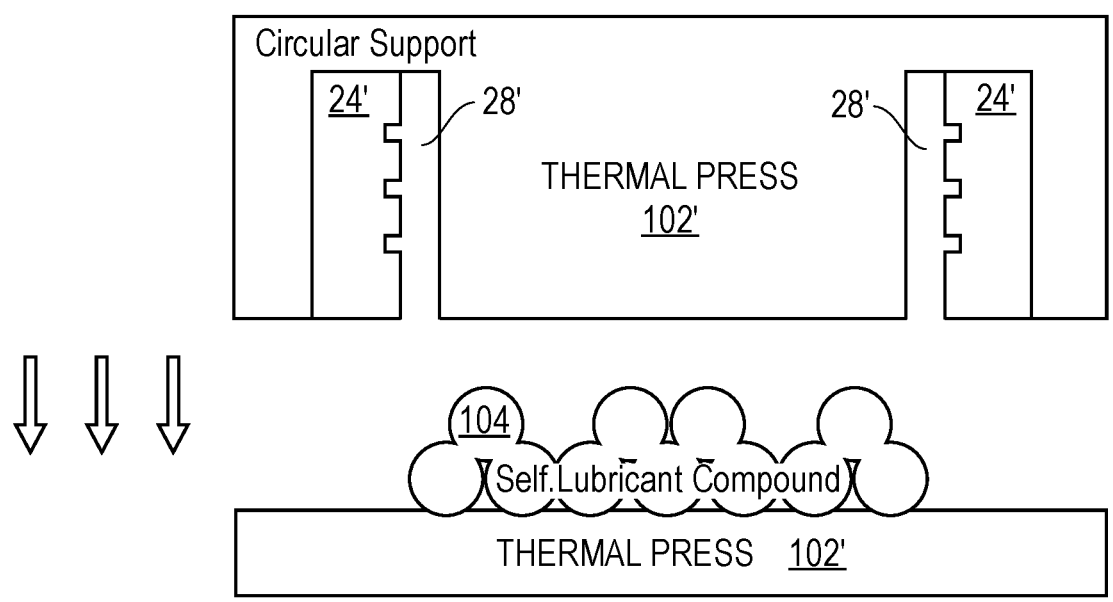
FIG. 12 depicts a cross sectional view of a thermal press with tank sidewall inserted into a top plate of the thermal press, in accordance with one embodiment of the invention.

FIG. 12 depicts a cross sectional view of thermal press 102' with tank sidewall 24' inserted into a top plate of thermal press 102'. In contrast to tank sidewall 24 which contained a cavity for receiving an anchor portion of membrane 22, tank sidewall 24' contains grooves on an inner surface of tank sidewall 24' for receiving the anchor portion. Self-lubricant compound 104 is applied between the two plates of thermal press 102 shortly before the two plates of thermal press are pressed together.

Figure 13:
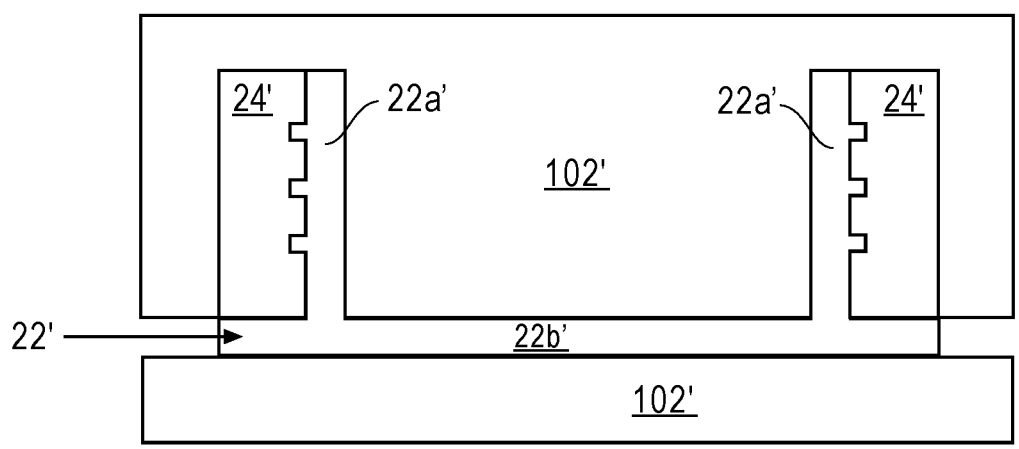
FIG. 13 depicts a cross sectional view of the thermal press after the two plates of the thermal press have been pressed together and heated, in accordance with one embodiment of the invention.

FIG. 13 depicts a cross sectional view of thermal press 102' after the two plates of thermal press 102' have been pressed together and heated. Self-lubricant compound 104 is pushed into cavity 28', forming anchor portion 22a' of membrane 22. Self-lubricant compound 104 is also flattened, by the flat plate portions of thermal press 102, into base portion 22b' of membrane 22.

Figure 14:
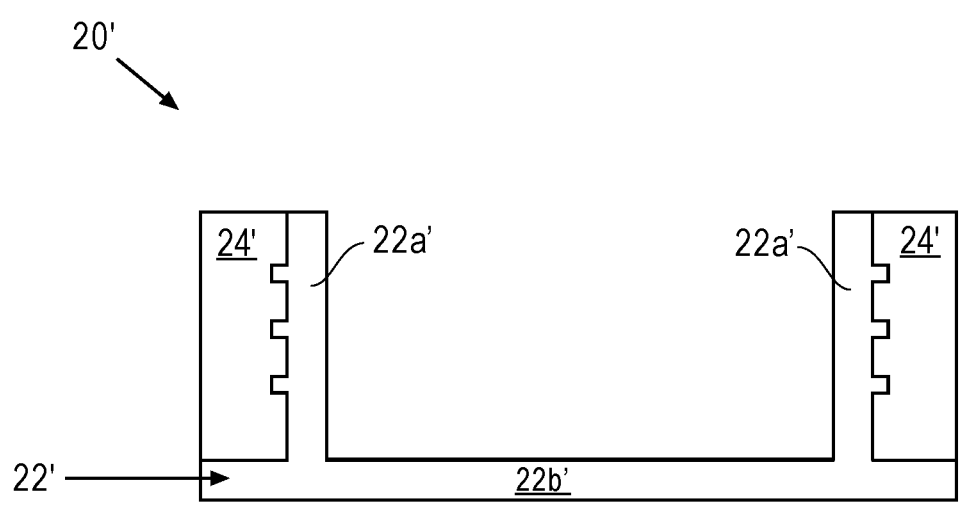
FIG. 14 depicts a cross sectional view of the tank after the tank has been extracted from the thermal press, in accordance with one embodiment of the invention.

FIG. 14 depicts a cross sectional view of tank 20' after tank 20' has been extracted from thermal press 102. Membrane 22' is fixedly attached to a sidewall surface of tank sidewall 24' via anchor portion 22a' which extends in a perpendicular direction from base portion 22b' of membrane 22'. In contrast to tank 20, membrane 22' of tank 20' forms the surface of not only the tank bottom but also the tank sidewalls.

Figure 15:
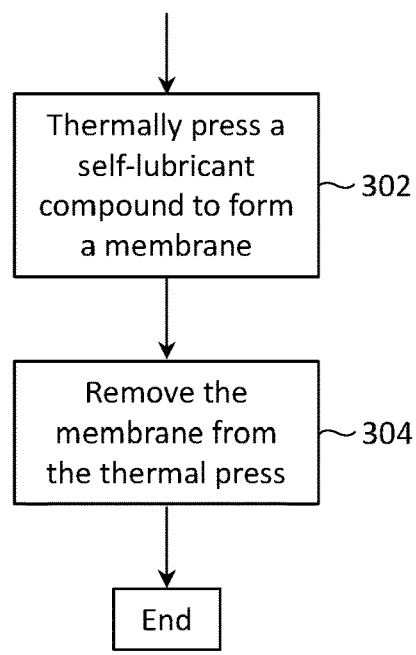
FIG. 15 depicts a flow chart of a process to form a self-lubricating membrane, in accordance with one embodiment of the invention.

FIG. 15 depicts a flow chart of a process to form a self-lubricating membrane, in accordance with one embodiment of the invention. At step 302, self-lubricant compound is thermally pressed, by thermal press 102, to form membrane 22. Membrane 22 may include circular-shaped base portion (22b or 22b') and anchor portion (22a or 22a') extending approximately perpendicular from a rim of base portion 22b. At step 304, membrane 22 is removed from thermal press 102.

Figure 16:
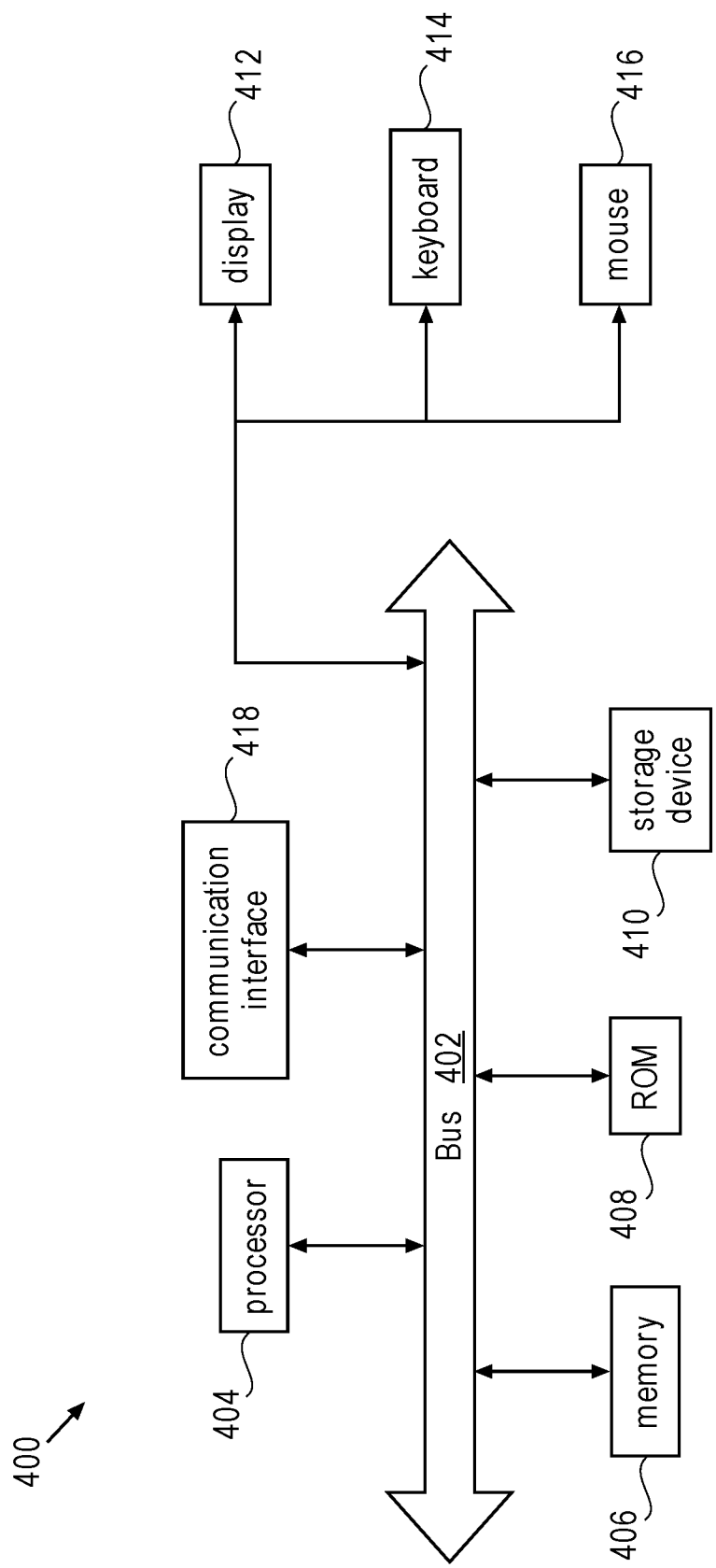
FIG. 16 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 16 provides an example of system 400 that may be representative of any of the computing systems (e.g., controller 90) discussed herein. Note, not all of the various computer systems have all of the features of system 400. For example, certain ones of the computer systems discussed above may not include a display inasmuch as the display function may be provided by a client computer communicatively coupled to the computer system or a display function may be unnecessary. Such details are not critical to the present invention.

System 400 includes a bus 402 or other communication mechanism for communicating information, and a processor 404 coupled with the bus 402 for processing information. Computer system 400 also includes a main memory 406, such as a random access memory (RAM) or other dynamic storage device, coupled to the bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to the bus 402 for storing static information and instructions for the processor 404. A storage device 410, for example a hard disk, flash memory-based storage medium, or other storage medium from which processor 404 can read, is provided and coupled to the bus 402 for storing information and instructions (e.g., operating systems, applications programs and the like).

Computer system 400 may be coupled via the bus 402 to a display 412, such as a flat panel display, for displaying information to a computer user. An input device 414, such as a keyboard including alphanumeric and other keys, may be coupled to the bus 402 for communicating information and command selections to the processor 404. Another type of user input device is cursor control device 416, such as a mouse, a trackpad, or similar input device for communicating direction information and command selections to processor 404 and for controlling cursor movement on the display 412. Other user interface devices, such as microphones, speakers, etc. are not shown in detail but may be involved with the receipt of user input and/or presentation of output.

The processes referred to herein may be implemented by processor 404 executing appropriate sequences of computer-readable instructions contained in main memory 406. Such instructions may be read into main memory 406 from another computer-readable medium, such as storage device 410, and execution of the sequences of instructions contained in the main memory 406 causes the processor 404 to perform the associated actions. In alternative embodiments, hard-wired circuitry or firmware-controlled processing units may be used in place of or in combination with processor 404 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 400 or similar electronic computing device, that manipulates and transforms data represented as physical (electronic) quantities within its registers and memories into other data similarly represented as physical quantities within its memories or registers or other such information storage, transmission or display devices.

Computer system 400 also includes a communication interface 418 coupled to the bus 402. Communication interface 418 may provide a two-way data communication channel with a computer network, which provides connectivity to and among the various computer systems discussed above. For example, communication interface 418 may be a local area network (LAN) card to provide a data communication connection to a compatible LAN, which itself is communicatively coupled to the Internet through one or more Internet service provider networks. The precise details of such communication paths are not critical to the present invention. What is important is that computer system 400 can send and receive messages and data through the communication interface 418 and in that way communicate with hosts accessible via the Internet.

The present invention is described by way of example only, without limiting the scope of application, according to its preferred embodiments, but it shall be understood that the invention may be modified and/or adapted by experts in the field without thereby departing from the scope of the inventive concept, as defined in the claims herein.

What is claimed is:

1. An apparatus, comprising:
    a tank configured to hold a photo-curing liquid polymer, the tank including a membrane that is transparent to a radiation emitted by a light source, the membrane forming a bottom surface of the tank and the tank having a tank sidewall, wherein the membrane comprises a base portion and an anchor portion and the anchor portion is disposed in a cavity of the tank sidewall;
    a circular-shaped disk disposed below the membrane, wherein the circular-shaped disk is transparent to the radiation;
    a frame configured to support the circular-shaped disk, wherein a base portion of the frame comprises a radiation-transparent printing window; and
    means for rotating the membrane about an axis of rotation parallel to a propagation direction of the radiation, the means for rotating being included in the frame and configured to impart a rotational motion to the tank via a magnetic coupling between the means for rotating and the tank sidewall.

2. The apparatus of claim 1, wherein the tank sidewall and the membrane are separately manufactured components and the membrane is friction fit to a lower portion of the tank sidewall.

3. The apparatus of claim 1, wherein the membrane is transparent to radiation within a first frequency band that includes one or more frequencies corresponding to activation frequencies of photo-curing agents included in the photo-curing liquid polymer.

4. The apparatus of claim 1, wherein the circular-shaped disk is transparent to radiation within a first frequency band that includes one or more frequencies corresponding to activation frequencies of photo-curing agents included in the photo-curing liquid polymer.

5. The apparatus of claim 1, wherein the base portion of the frame comprises a circular-shaped rim above which the circular-shaped disk is disposed, and wherein the radiation-transparent printing window is located adjacent to a center of the circular-shaped rim.

6. The apparatus of claim 1, further comprising an extraction plate configured to suspend therefrom a partially formed photo-cured object at least partially within the photo-curing liquid polymer.

7. The apparatus of claim 1, further comprising a channel configured to transport photo-curing liquid polymer from a reservoir of photo-curing liquid polymer into the tank.

8. The apparatus of claim 1, wherein the light source is disposed beneath the radiation-transparent printing window of the frame and is configured to emit the radiation.

9. The apparatus of claim 1, further comprising a controller including a processor and a memory, the controller communicatively coupled to the light engine and the rotating means.

10. The apparatus of claim 1, further comprising:
    a lubricant brush configured to spread a lubricant onto the membrane, wherein the lubricant brush is disposed inside the tank over a region of the frame other than the radiation-transparent printing window.

11. The apparatus of claim 1, wherein the radiation-transparent printing window of the base portion is formed by a cutout in the base portion.

12. The apparatus of claim 1, wherein the frame further comprises a frame sidewall, the frame sidewall configured to surround the tank sidewall.

13. The apparatus of claim 1, wherein the circular-shaped disk comprises borosilicate glass.

14. The apparatus of claim 1, wherein the circular-shaped disk is frictionally coupled to the membrane.

15. The apparatus of claim 1, wherein the tank is rotationally-symmetric with a cylindrically-shaped tank sidewall, the tank is configured to be removably received in a cavity of the frame, and a top portion of the tank is unsealed.

16. The apparatus of claim 15, wherein the membrane is composed of a self-lubricating, silicone-based polymer material.

17. The apparatus of claim 15, wherein the membrane is attached to an inward facing surface of the cylindrically-shaped tank sidewall.

18. The apparatus of claim 15, wherein the membrane is fit over a rim of the cylindrically-shaped tank sidewall.

19. The apparatus of claim 15, wherein the light source is disposed beneath the radiation-transparent printing window.

\* \* \* \* \*